United States Patent [19]
Kohari et al.

[11] Patent Number: 5,536,916
[45] Date of Patent: Jul. 16, 1996

[54] METHOD FOR PERFORMING AUTOMATIC ALIGNMENT-ADJUSTMENT OF LASER ROBOT AND THE DEVICE

[75] Inventors: Toshio Kohari, Nagoya; Ryuichiro Takata, Ichinomiya; Koichi Ishihara, Nagoya, all of Japan

[73] Assignee: Sanyo Machine Works, Ltd., Aichi-ken, Japan

[21] Appl. No.: 315,717

[22] Filed: Sep. 30, 1994

[51] Int. Cl.⁶ .......................... B23K 26/04; G01B 11/27
[52] U.S. Cl. ............... 219/121.83; 219/121.74; 219/121.78; 356/153
[58] Field of Search .......... 219/121.83, 121.77, 219/121.78, 121.79, 121.8, 121.81, 121.74, 121.85; 356/153, 150, 152.1, 152.2, 152.3; 250/201.1

[56] References Cited

U.S. PATENT DOCUMENTS

| | | | |
|---|---|---|---|
| 3,902,036 | 8/1975 | Zaleckas | 219/121.81 |
| 4,319,839 | 3/1982 | Durran | 356/153 |
| 4,576,480 | 3/1986 | Travis | 356/153 |
| 4,618,759 | 10/1986 | Müller et al. | 219/121.78 |
| 4,659,916 | 4/1987 | Müller et al. | 219/121.79 |
| 4,675,501 | 6/1987 | Klingel | 219/121.67 |
| 4,707,596 | 11/1987 | Hohberg | 219/121.78 |
| 5,011,282 | 4/1991 | Ream et al. | 356/153 |
| 5,233,202 | 8/1993 | Torii et al. | 219/121.78 |

FOREIGN PATENT DOCUMENTS

| | | |
|---|---|---|
| 509933 | 10/1992 | European Pat. Off. . |
| 58-224088 | 12/1983 | Japan ............... 219/121.78 |
| 62-227589 | 10/1987 | Japan ............... 219/121.8 |
| 2-205289 | 8/1990 | Japan ............... 219/121.78 |
| 2-235593 | 9/1990 | Japan ............... 219/121.8 |
| 2-180292 | 8/1991 | Japan . |
| 4-17990 | 1/1992 | Japan . |

Primary Examiner—Geoffrey S. Evans
Attorney, Agent, or Firm—Nikaido, Marmelstein, Murray & Oram

[57] ABSTRACT

Automatic alignment correction of the setting angles of mirrors in a laser robot is achieved by mirrors 2c, 2d, and 2e being linearly displaced a predetermined distance in a sequence from one closer to a laser oscillator 1 to another. At the same time, a locus of displacement of a spot S on a position sensor during movement of a particular mirror is detected by the position sensor 9 disposed in front of a laser output nozzle 4. An error in the setting angle of a mirror preceding to the particular mirror having been moved is computed on the basis of the detected value, so as to perform angular correction relative to the particular mirror by motors 11a and 11b. In one embodiment, mirror 2e is rotated about the C-axis. When the incident position of the laser beam is offset from the center of rotation of the mirror 2e, the spot S obtained in the position sensor 9 will move in a circular path. The center of the circle is determined and the setting angle of the mirror 2c is adjusted so that the spot S comes to the center. Because of this modification in the setting angle of mirror 2c, the optical axis between mirrors 2d and 2e is again out of parallel to the Z-axis. This operation is then repeated to minimize the size of the spot S. By this sequence, the laser beam incident to the mirror 2e is accurately directed to the center of the mirror 2e in parallel with the C-axis.

7 Claims, 5 Drawing Sheets

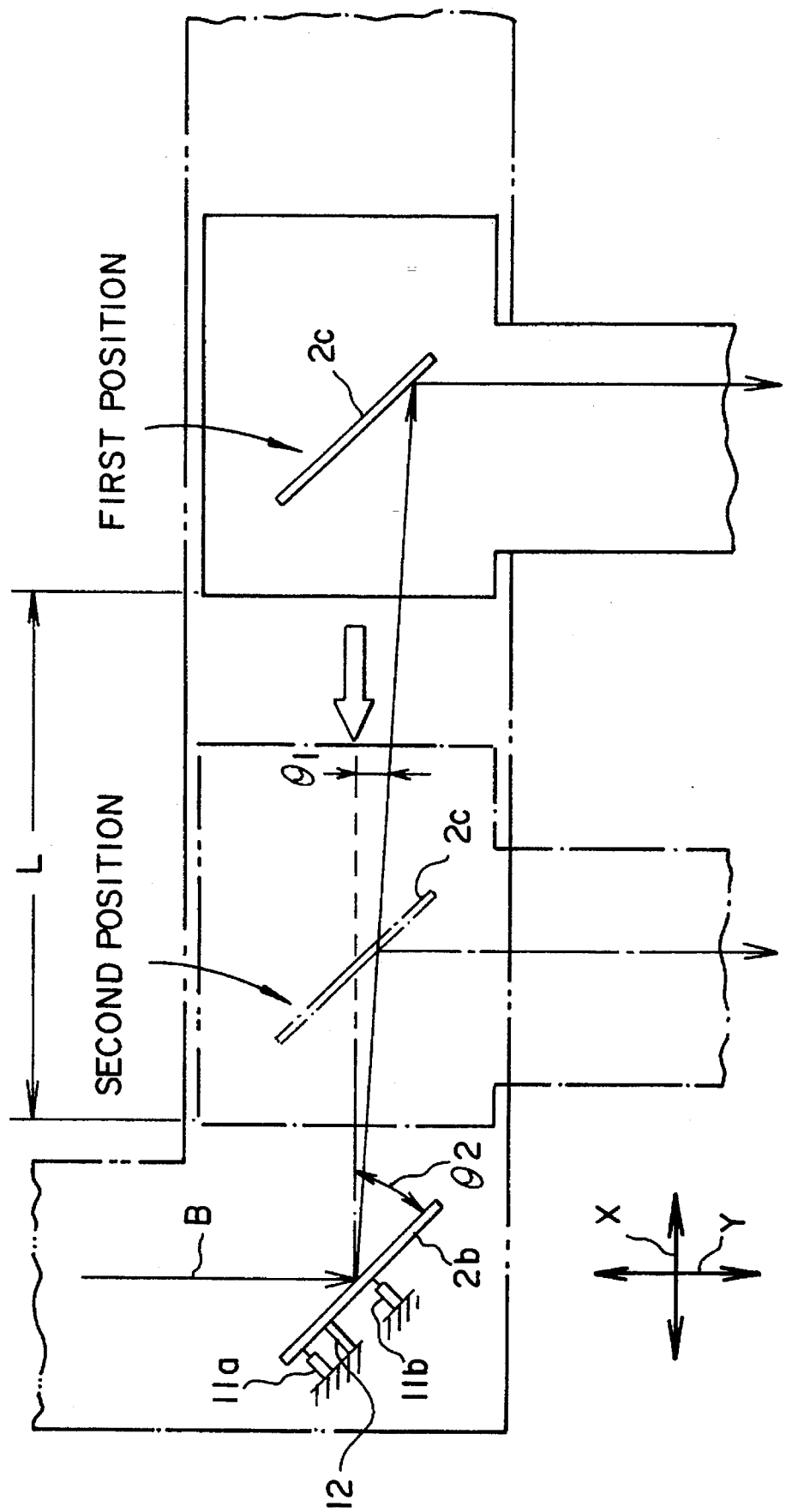

METHOD FOR PERFORMING AUTOMATIC ALIGNMENT-ADJUSTMENT OF LASER ROBOT AND THE DEVICE

FIELD OF THE INVENTION

This invention relates to a method for performing automatic alignment-adjustment relative to a laser robot and the device therefor.

BACKGROUND OF THE INVENTION

In a multi-axis laser robot in each of which a laser output nozzle is displaceable in three-dimensional directions, a laser beam output from a laser oscillator is directed to an output nozzle through a multistage mirror. Relative distance between the mirrors may be decreased and increased. Such decrease and increase in the relative distance is performed by means of at least three mirrors which are displaceable, respectively in X, Y and Z directions.

When a setting angle of each of the mirrors is not accurately adjusted, a laser beam is not able to be directed along a path to a converging mirror preceding the output nozzle, i.e., parabolic mirror, at a proper position and at a proper angle, so that it is impossible to obtain a laser spot having an appropriate diameter on a surface of a workpiece. In order to eliminate the above inconvenience, an He-Ne (helium-neon) laser provided for adjustment purposes the beam of which is visible, has been conventionally used. A target plate having a scale thereon is perpendicularly disposed just before the mirrors in the beam path so as to determine whether the laser beam is accurately directed at the center of each of the mirrors. When a spot of the laser beam is offset from the center of the scale of the target plate, a mirror preceding the mirror behind the target plate is manually and adjustably pivoted so that the spot of the laser beam may be directed at the center of the scale.

It is noted, however, that such manual adjustment for the mirrors is complicated and time-consuming. It is also possible for the He-Ne laser beam to be disadvantageouly directed to an eye of an operator performing alignment operation when it is inadvertently reflected onto a casing of a watch of the operator.

It is a main object of the invention to provide an automatic alignment-adjustment device and method capable of automatically correcting a setting angle of a mirror to a correct angle.

SUMMARY OF THE INVENTION

In order to achieve the above object, the present invention provides an automatic alignment-adjustment device for use in a laser robot in which a laser beam from a laser oscillator is directed along an optical path to a laser output nozzle through a plurality of mirrors and in which the laser output nozzle is displaced by decreasing or increasing a relative axial distance between the mirrors comprising: a displacement means for linearly moving said mirrors a respective predetermined distance in a sequence between a first position closer to said laser oscillator and another position further along the axis; a position sensor disposed in front of said laser output nozzle for detecting a coordinate of a spot of a laser beam projected from the laser output nozzle; an arithmetic means for computing an error in the setting angle of a mirror relative to a next mirror on the basis of a locus of displacement of the coordinate of the spot when said next mirror is moved axially; and pivot means for adjustively pivoting each said mirror so as to set said mirror at a proper setting angle on the basis of the error computation of said arithmetic means.

The invention also provides an automatic alignment-adjustment method for automatic adjustment of an optical axis of a laser beam in a laser robot including a plurality of mirrors adapted to be changed in their setting angle and axially toward and away from one another, so that a laser beam may be directed along a path from a laser oscillator to a laser output nozzle by means of the plurality of mirrors comprising the steps of: attaching a position sensor to said laser output nozzle; measuring an amount of fluctuation of a spot of a laser beam on the position sensor when each mirror is moved axially; and sequentially correcting the setting angle of each of the mirrors on the basis of said amount of fluctuation measured.

The invention further provides an automatic alignment-adjustment method comprising the steps of: displacing a first mirror preceding a converging means in a direction along a movable axis thereof and supplying X-Y data of the locus of a spot obtained in said position sensor during movement of said first mirror to a drive means for a second mirror preceding to said first mirror as a feedback signal, so as adjust the setting angle of said second mirror such that X-Y data of the spot obtained in said position sensor will not be fluctuated when said first mirror is displaced; rotating said first mirror about the movable axis thereof and supplying X-Y data of a spot obtained in said position sensor during the rotational movement of said first mirror a drive means for a third mirror preceding to said second mirror as a feedback signal so as to adjust the setting angle of said third mirror, whereby the spot of laser beard is placed at the center of a circle represented by said spot; and repeating the above steps so that the laser beam incident to said first mirror is directed to the center of said first mirror in parallel with said movable axis of said first mirror.

The invention also provides an automatic alignment-adjustment method comprising the steps of: disposing said position sensor at a focal position of said converging means, rotating said converging means, supplying X-Y data of the spot obtained in said position sensor during rotatable movement of said converging means to the drive means for said first mirror as a feedback signal, so as to adjust the setting angle of said first mirror whereby the spot of laser beam is placed on the focal position of said converging means.

When the setting angle of each of the mirrors is correct, the position and angle of a laser beam incident the parabolic mirror preceding to the output nozzle will not be changed when each mirror is linearly displaced. Thus, the spot on the position sensor will not be moved at all.

On the other hand and when there is an error in the setting angle of a particular mirror, the position and angle of a laser beam incident to the parabolic mirror will be changed when a mirror following the particular mirror is moved axially, so that the spot on the position sensor will be displaced. The direction and length of the locus of displacement of the spot on the position sensor has a predetermined corresponding relationship with the setting angle of the particular mirror and the distance by which the following mirror has been linearly displaced. Thus, it is possible to obtain an error in the setting angle of the particular mirror by computing the data of the locus of spot displacement by means of the arithmetic means.

The influence resulting from the error in the setting angle of the mirror will be increased as the output nozzle is approached. Therefore, correction for the above error is performed relative to the mirrors, starting with one closer to the laser oscillator. The mirrors are sequentially pivoted by the pivot means on the basis of the result from the arithmetic means so as to be corrected to their respective proper setting angles. Upon completion of the correction operation, the spot on the position sensor will not be moved at all if any one of the mirrors is displaced.

The output nozzle is usually mounted so as to be pivoted about a vertical axis and about a horizontal axis. Adjustment of the optical axis relative the rotational axes constituting the vertical axis and horizontal axis, respectively, are performed by placing the optical axis into a parallel relationship with the movable axis, and then rotating the mirror and the converging means about the rotatable axis. When the incident position of the laser beam is not at the center of the mirror and the converging means, the spot on the position sensor will be fluctuated in a circular path when the mirror and the converging means are rotated. Thus, the setting angle of the preceding mirror is adjusted so as to place the position of the spot at the center of the circle, so that the incident position of the laser beam becomes in coincident with the center of the mirror. When the mirror in the final stage or the converging means is rotated about the beam path axis so as to cause circular movement of the spot on the position sensor, it is preferable to position the position sensor at the focal position of the parabolic mirror since it is necessary to place the spot at the center of the circular movement. This results in a clear locus of a circular movement of the spot.

On the other hand, and when the alignment-adjustment is performed by means of a linear displacement of a mirror with the position sensor disposed at the focal position of the parabolic mirror, it is possible for X-Y data of the spot to be unchanged when an incident angle of the laser beam is slightly changed. In such a case, it is possible for the change in X-Y data to be clearly read even when the incident angle of the laser beam is slightly changed, by disposing the position sensor at a position slightly offset away from the focal position.

BRIEF DESCRIPTION OF THE DRAWINGS

In the drawings,

FIG. 4 is a plan view showing a manner in which a laser beam is reflected,

DETAILED DESCRIPTION OF THE PREFERRED EMBODIMENTS

The invention will be explained in detail below with reference to the drawings illustrating one embodiment of the invention in which an automatic alignment-adjustment device is applied to a three axis laser robot.

Figure 1:
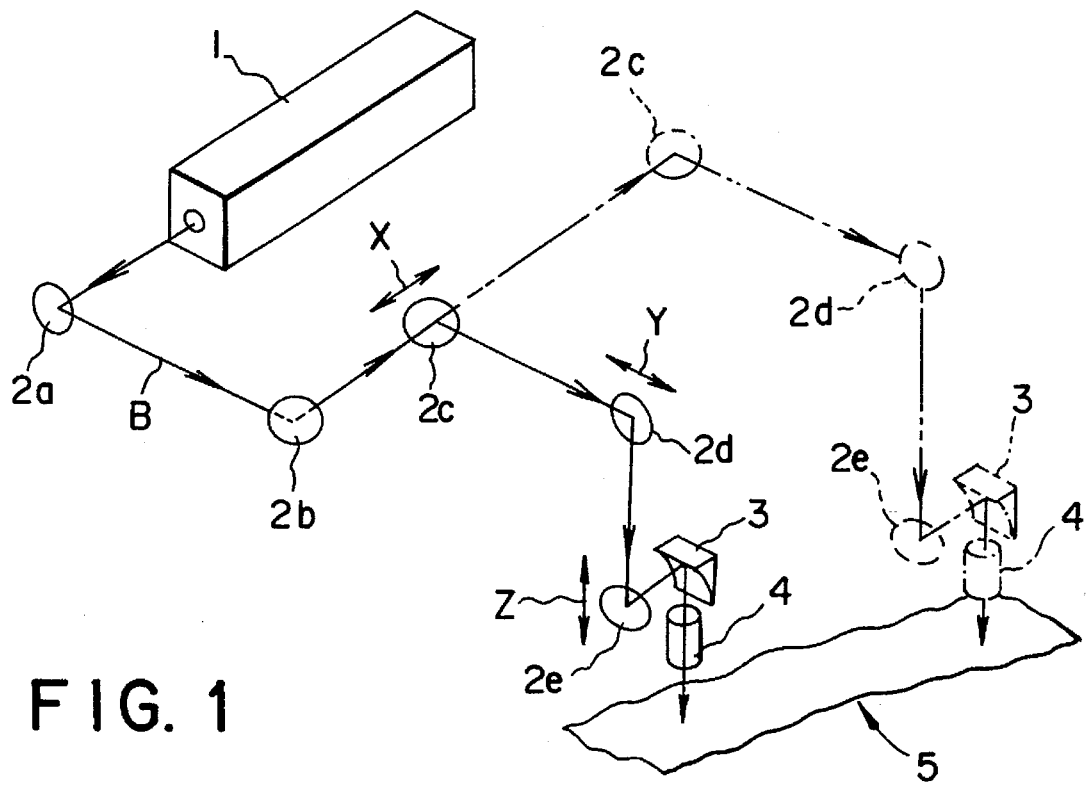
FIG. 1 is a diagrammatic perspective view of a three axis laser robot.

FIG. 1 diagrammatically illustrates a three axis laser robot. The laser robot includes a laser oscillator 1 for laser machining, plane mirrors 2a, 2b . . . 2e constituting a multistage reflecting mirror, a parabolic mirror 3 constituting a final-stage converging mirror and a laser output nozzle 4. The mirror 2c, 2d and 2e are adapted to be displaced respectively in the X, Y and Z directions by means of an appropriate displacement means, so as to perform machining of a workpiece 5 while the output nozzle is displaced in the three dimensional direction. The remaining mirrors 2a and 2b are positioned at a respective predetermined position. It is noted that the mirror 2e, the parabolic mirror 3 and the output nozzle 4 are assembled to a laser head portion, so that the positional relationship therebetween is constant or fixed.

Normally, the laser oscillator I is a carbon dioxide gas laser oscillator. It is noted, however, that the laser oscillator 1 is changed to be an He-Ne laser oscillator only when an automatic alignment-adjustment is performed, so as to protect a position sensor 9 (to be explained later) against damage. The He-Ne laser provides a visible radiation which is not harmful to a human body and is convenient in terms of visual observation. It is noted that, when a position sensor which will be damaged from a spot of the carbon dioxide gas laser for machining is employed, it is possible to conduct the alignment-adjustment work and the subsequent laser machining without changing the carbon dioxide gas laser oscillator to an He-Ne laser oscillator, so that working efficiency is further increased.

Figure 2:
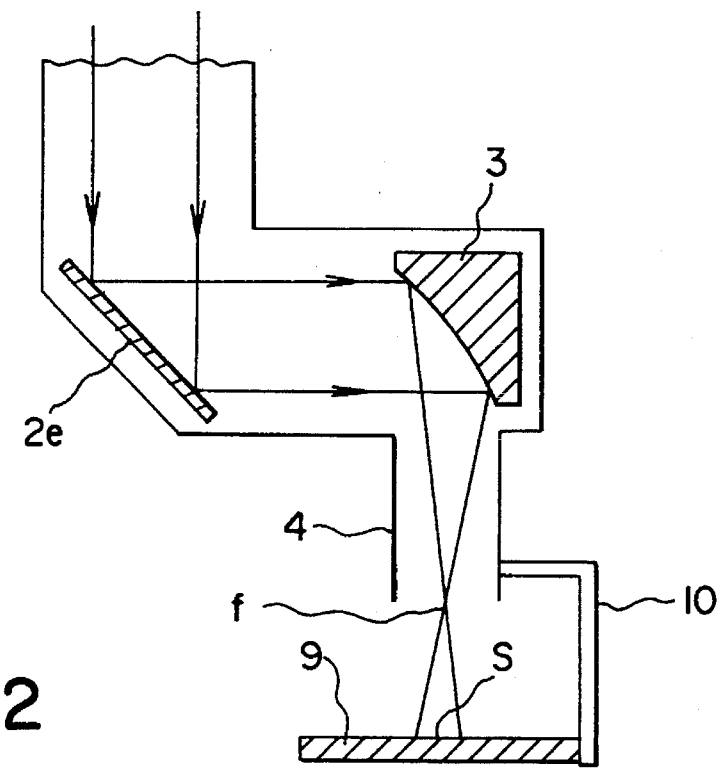
FIG. 2 is a sectional view showing an output nozzle.
Figure 3A:
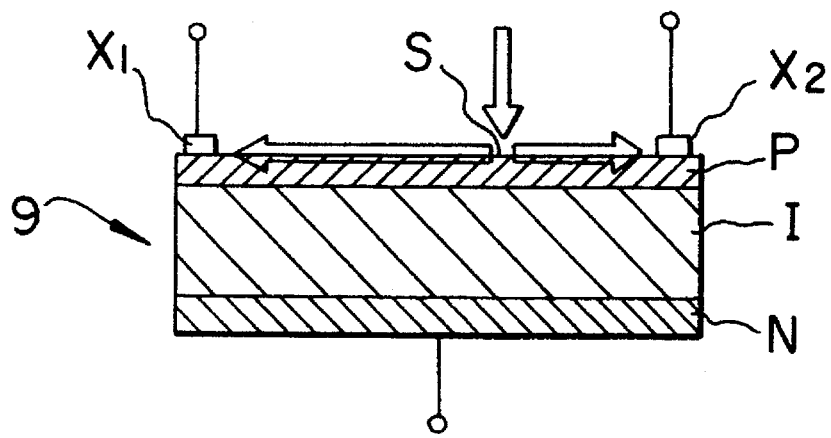
FIG. 3(a) is a sectional view showing a position sensor.
Figure 3B:
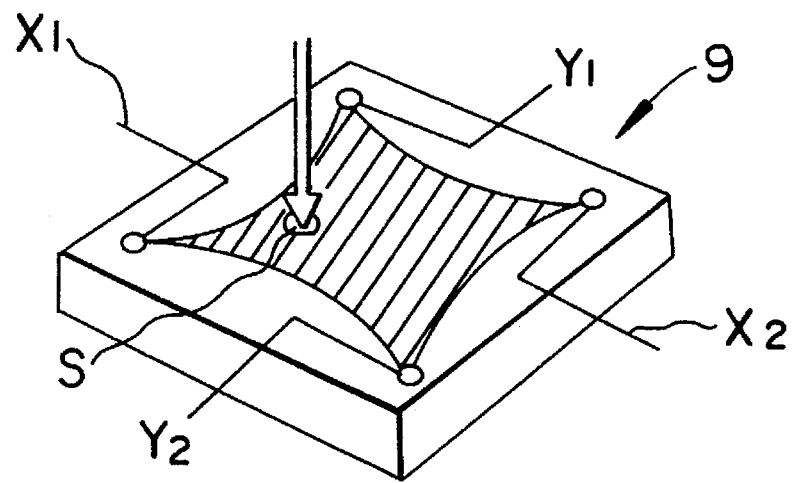
FIG. 3(b) is a perspective view of the position sensor.

As shown in FIG. 2, the above mentioned position sensor 9 is attached to the output nozzle 4 by means of a removable fixation fitting 10. The position sensor 9 is spaced from the output nozzle 4 by a predetermined distance and arranged perpendicularly to the output nozzle 4. In the illustrated embodiment, the position sensor 9 is a semiconductor position detective element (PSD) of an applied photo-diode. The PSD is composed of three layers including a P-layer having a uniform resistivity and disposed on one surface of a planar silicon, an N-layer on the backside of the planar silicon, and an intermediate I-layer, as shown in FIGS. 3(a) and 3(b). When a spot S is projected onto the position sensor 9, an electric charge in proportion to the optical energy is caused at the position of projection. The position sensor 9 is of a construction as shown in FIG. 3(a) having a two-dimensional configuration as shown in FIG. 3(b), so that the XY coordinate data at the point of maximum optical strength in the spot S may be taken from four electrodes X1, X2, Y1 and Y2 as proportionally divided electric current values, respectively. It is noted that a CCD, rather than a PSD, may be used as the position sensor 9.

As shown in FIG. 4, mirrors 2b, 2c and 2d are mounted with respective pivot means for performing automatic correction of their setting angles. The pivot means is adapted to support the corresponding mirror at three points. With regard to the mirror 2b, the pivot means includes two motors 11a and 11b for separately driving two screws in threading engagement with the backside of the mirror 2b, and a fulcrum pin 12 in engagement with the backside of the mirror for supporting the same. The remaining pivot means for the mirrors 2c and 2d have the same construction.

Figure 5:
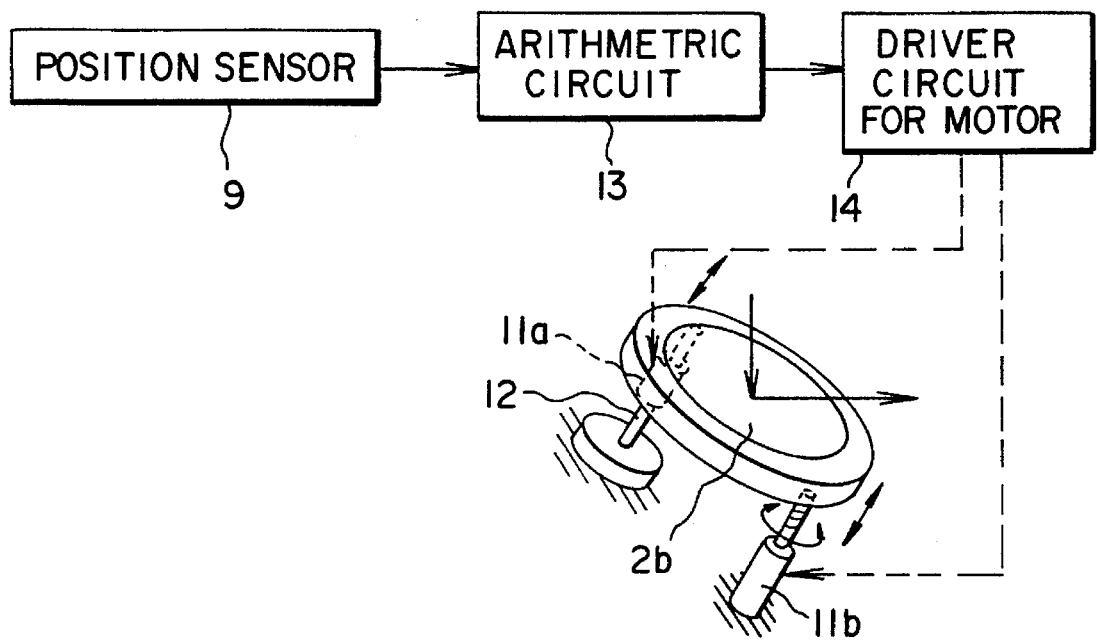
FIG. 5 is a block diagram illustrating pivotal control for a mirror.

The position sensor 9 is electrically connected to a driver circuit 14 for the actuation of motors 11a and 11b through an arithmetic circuit 13, as shown in FIG. 5. The arithmetic circuit 13 computes an error in the setting angle of the mirror 2b based on the locus of the coordinate of spot S obtained from the position sensor 9 and inputs an instruction signal for correction of the error to the driver circuit 14. The construction of FIG. 5 is equally applied to the remaining two mirrors 2c and 2d.

The automatic alignment-adjustment operation with regard to the above embodiment will be explained below.

Prior to an alignment-adjustment operation, the laser oscillator 1 is replaced with an He-Ne laser oscillator for the purpose of adjustment. Then, the position sensor 9 is attached to the output nozzle 4, as shown in FIG. 2. The setting angles for the mirrors 2b–2d are roughly adjusted so that the He-Ne laser beam may reach the position sensor 9. The rough adjustment is performed by manually controlling the motors 11a and 11b. Upon actuation of a start switch, the alignment-adjustment will be performed automatically in the following manner.

First, the mirrors are linearly displaced a respective predetermined distance in a sequence from one adjacent to the laser oscillator 1, i.e., sequentially from the mirror 2c to the mirror 2e in the illustrated embodiment. FIG. 4 illustrates the case in which the mirror 2c is displaced a distance L from a first position to a second position. When there is an error θ1 in the setting angle of the mirror 2b, which is positioned just before the mirror 2c, the reflection point on the mirror 2c is displaced when the mirror 2c is moved. Thus, the position of spot S on the position sensor 9 is also displaced. The relationship between the locus of displacement of the spot S and the error in the setting angle is preliminarily stored in the arithmetic circuit 13. Thus, an angle error θ1 of the mirror 2b is computed when the data of displacement locus of the spot S is input to the arithmetic circuit 13. Then, an instruction signal for correction of the error is input to the drive circuit 14, so that the motors 11a and 11b are actuated so as to position the mirror 2b at an appropriate setting angle θ2 to correct the angle error θ1.

Similar angular correction is sequentially performed relative to the mirrors 2c and 2d. When all necessary angular correction has been performed, the He-Ne laser oscillator is replaced with the original laser oscillator 1 for machining purpose and the position sensor 9 is removed. By this, alignment-adjustment work is completed.

Figure 7:
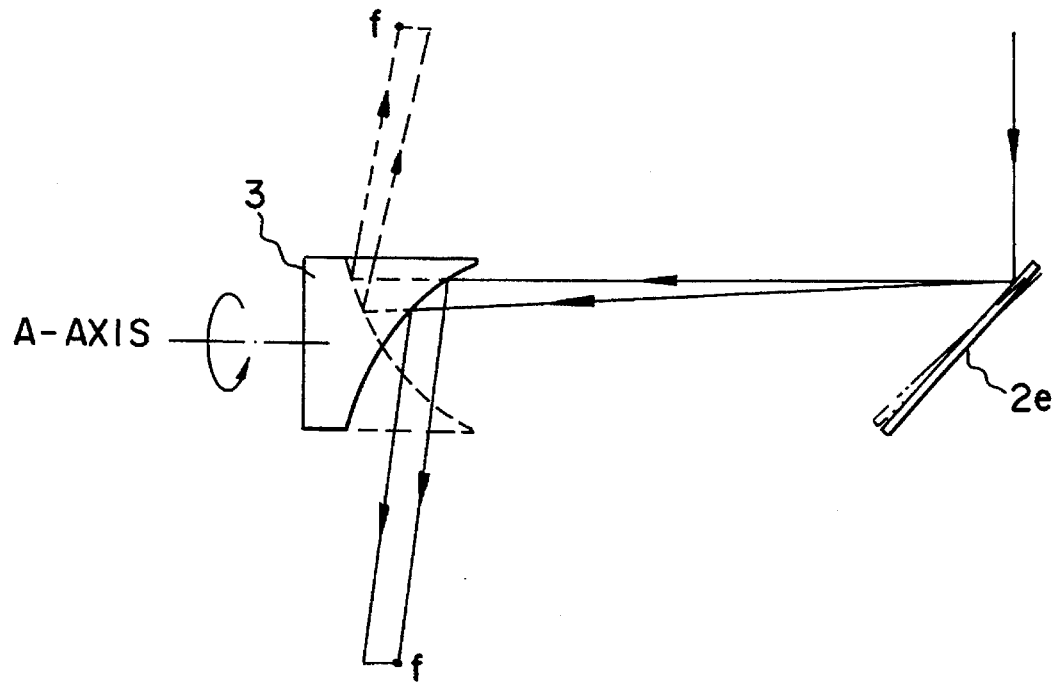
FIG. 7 is a diagrammatic view illustrating an optical axis adjustment for a rotational axis (A-axis).
Figure 6:
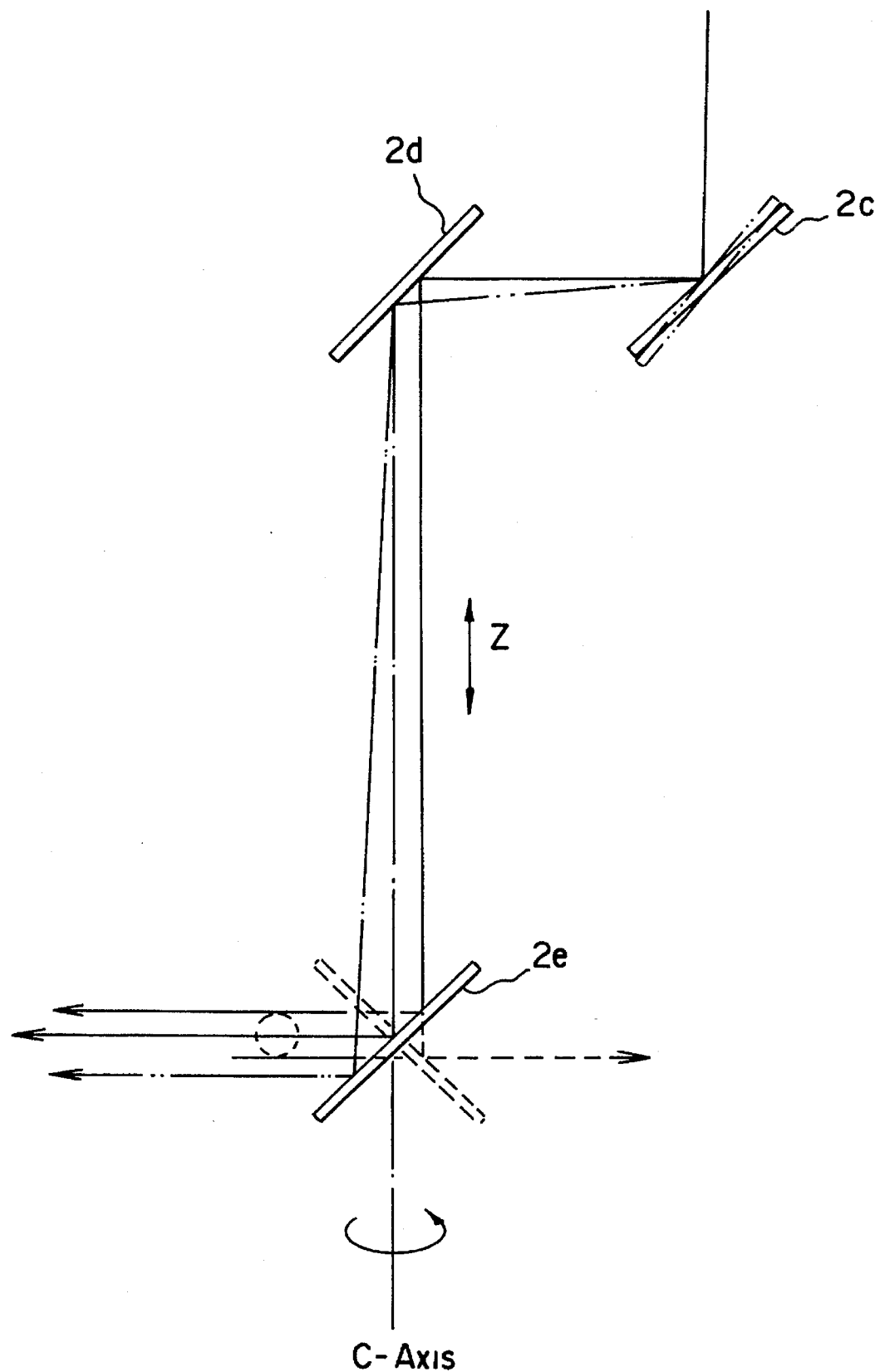
FIG. 6 is a diagrammatic view illustrating an optical axis adjustment for a rotational axis (C-axis)

FIGS. 6 and 7 illustrate an embodiment in which a laser beam alignment is applied to a five axis laser robot wherein the laser output nozzle 4 is not only displaceable in the directions of each of the X-axis, Y-axis and Z-axis, but also wherein mirror 2e is rotatable about a C-axis parallel with the Z-axis and parabolic mirror 3 is rotatable about an A-axis perpendicular to the Z-axis.

Operation of optical axis adjustment for the C-axis will be explained with reference to FIG. 6 After completion of rough alignment whereby the laser beam may reach the laser output nozzle 4, the position sensor 9 is attached to the laser output nozzle 4 (FIG. 2) at a position offset axially from the focal point f of the parabolic mirror 3, e.g., at a position below the focal point as shown in FIG. 2.

The mirror 2e just before the parabolic mirror 3 is then displaced in the Z-axis direction. If the laser beam is not in parallel with the Z-axis, i.e., the optical axis between the mirrors 2e and 2d is not in parallel with the Z-axis, X-Y data of the spot S obtained in the position sensor 9 will be fluctuated. Thus, the inclination of the mirror 2d is obtained from the fluctuated data and the inclination of the mirror 2d is automatically adjusted by means of the driver device, so as to prevent the spot of the laser beam at the laser output nozzle 4 from being fluctuated when the mirror 2e is displaced. When no fluctuation of the X-Y data of the position sensor 9 is observed upon displacement of the mirror 2e, this means that the optical axis between the mirrors 2d and 2e becomes parallel with the X-axis.

Then, the mirror 2e is rotated about the C-axis. When the incident position of the laser beam is offset from the center of rotation of the mirror 2e, the spot S obtained in the position sensor 9 will be fluctuated to move in a circular path. The center of the circle is determined and the setting angle of the mirror 2c is adjusted so that the spot S comes to the center.

Due to the modification in the setting angle of the mirror 2c, the optical axis between the mirrors 2d and 2e again becomes to be out of parallel relationship with the Z-axis. Thus, the series of operation, starting with the displacement of the mirror 2e in the Z-axis direction, mentioned above is repeated, so that the Mount of fluctuation of the spot S will be minimized. By this, the laser beam incident to the mirror 2e is accurately directed to the center of the mirror 2e in parallel with the C-axis.

Adjustment of the optical axis for alignment with the A-axis will be explained with reference to FIG. 7. The position sensor 9 is set at the focal point f of the parabolic mirror 3 and the parabolic mirror 3 is rotated about the A-axis. If in the case in which the laser beam is directed to the parabolic mirror 3 out of parallel therewith, in other words, in the case in which the optical axis between the mirror 2e and the parabolic mirror 3 is not parallel with the A-axis, the spot S on the position sensor 9 will be fluctuated in a circular path as the parabolic mirror 3 is rotated. Thus, the center of the circle is obtained and the setting angle of the mirror 2e is adjusted so that the spot S comes to the center. When no fluctuation of the spot S is observed upon rotation of the parabolic mirror 3, this means that the optical axis between the mirror 2e and the parabolic mirror 3 becomes in parallel with the A-axis.

In accordance with the invention, the mirrors are displaced a respective predetermined distance in a sequence from one closer to the laser oscillator, while at the same time detecting a locus of displacement of a spot on the position sensor during movement of the particular mirror by means of the position sensor disposed in front of a laser output nozzle, so as to compute an error in the setting angle of a mirror positioned just before the mirror having been displaced on the basis of the detected value for correction of the angle of the particular mirror. Thus, the alignment-adjustment may be performed automatically with a single position sensor and in short time. Such automated operation increases accuracy in alignment-adjustment, so that a laser spot having an appropriate diameter may be obtained on the surface of a workpiece.

We claim:

1. An automatic alignment-adjustment device for a laser robot in which a laser beam from a laser oscillator is directed along an optical path through a plurality of mirrors on an axis to a laser output nozzle comprising:

a position sensor removably disposed at the output of said laser nozzle for detecting locus coordinates of a laser beam spot on said sensor;

displacement means for selectively linearly moving each of said mirrors along said axis to increase or decrease a relative distance between mirrors so as to change a locus of displacement of a spot caused by an offset beam on said position sensor when said relative distance is changed;

arithmetic means connected to said position sensor for computing errors in mirror angle settings based upon detected coordinates of said locus of displacement and for providing signals for correcting said errors;

drive means for correcting setting angles of each of said mirrors sequentially in accordance with said signals to bring the offset beam into parallel with said axis; and a rotatable mirror in said laser output nozzle provided with means for rotating said mirror about said axis to cause a spot of an offset beam to move in a circular path on said position sensor, said arithmetic means being arranged to provide signals to cause sequential adjustment of setting angles of mirrors in said optical path prior to said rotatable mirror to move the beam path so as to form a spot on said position sensor at the center of said circular path.

2. An automatic-adjustment device in accordance with claim 1, wherein said rotatable mirror in said laser output nozzle is a first mirror preceding a laser beam converging means, and said signals are provided while said position sensor is attached to the laser output nozzle at a position offset axially from a focal point of the laser beam converging means.

3. An automatic-adjustment device in accordance with claim 1, wherein said rotatable mirror in said laser output nozzle is a parabolic mirror serving as a laser beam converging means, and said signals are provided while said position sensor is set at a focal point of the parabolic mirror.

4. An automatic-adjustment device in accordance with claim 1 wherein both a parabolic mirror serving as a laser beam converging means and a first mirror preceding the laser beam converging means are rotatable about said axis so as to cause a spot of an offset laser beam to move in a circular spot.

5. An automatic alignment-adjustment method for adjustment of a laser beam in a laser robot from a laser oscillator to a laser output nozzle along an optical path including a plurality of mirrors relatively movable laterally with respect to each other and including drive means for correcting setting angles of said mirrors, said method including the steps of:

providing said robot with a single position sensor removably disposed at said laser output nozzle for detecting locus coordinates of a laser beam spot output from said nozzle onto said sensor;

conducting adjustment of said laser beam path through said plurality of mirrors by selectively displacing mirrors laterally, detecting locus coordinates of the laser spot on said position sensor as each mirror is moved from one position to another, computing errors in mirror angle settings based on said locus coordinates, and providing signals to said drive means to correct setting angles of said mirrors;

conducting adjustment of a portion of said laser beam path in said output nozzle including the step of rotating a mirror in said output nozzle about an axis thereof such that the laser beam spot on the position sensor moves in a circular path if the laser beam is offset from the center of rotation of said mirror; and adjusting angular position of a mirror prior to said rotated mirror so as to position said laser beam spot on said position sensor at the center of said circular path.

6. An automatic alignment-adjustment method in accordance with claim 5 wherein said rotating a mirror step comprises steps of rotating a mirror in said output nozzle prior to a parabolic mirror serving as a laser beam converging means, and positioning said position sensor to be offset axially from a focal point of said parabolic mirror.

7. An automatic alignment-adjustment method in accordance with claim 5 wherein said rotating a mirror step comprises steps of rotating a parabolic mirror serving as a laser converging means, and positioning said position sensor at a focal point of said parabolic mirror.

* * * * *